US009084969B1

(12) United States Patent
Wieting

(10) Patent No.: US 9,084,969 B1
(45) Date of Patent: *Jul. 21, 2015

(54) METHOD AND SYSTEM FOR RECYCLING PROCESSING GAS FOR SELENIZATION OF THIN FILM PHOTOVOLTAIC MATERIALS

(71) Applicant: Stion Corporation, San Jose, CA (US)

(72) Inventor: Robert D. Wieting, Simi Valley, CA (US)

(73) Assignee: Stion Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/282,925

(22) Filed: May 20, 2014

Related U.S. Application Data

(63) Continuation of application No. 13/343,473, filed on Jan. 4, 2012, now Pat. No. 8,728,200.

(60) Provisional application No. 61/432,869, filed on Jan. 14, 2011.

(51) Int. Cl.
*B01D 5/00* (2006.01)
*B01D 53/96* (2006.01)

(52) U.S. Cl.
CPC .............. *B01D 53/96* (2013.01); *B01D 5/0045* (2013.01); *B01D 5/0093* (2013.01)

(58) Field of Classification Search
CPC ............................ B01D 5/0045; B01D 5/0093
USPC ................................ 95/42, 193, 204; 422/285
See application file for complete search history.

(56) References Cited

U.S. PATENT DOCUMENTS

| | | | | | |
|---|---|---|---|---|---|
| 3,828,722 | A | * | 8/1974 | Reuter et al. | 118/725 |
| 4,263,336 | A | * | 4/1981 | Thompson et al. | 427/588 |
| 4,793,283 | A | * | 12/1988 | Sarkozy | 118/725 |
| 4,865,999 | A | * | 9/1989 | Xi et al. | 438/83 |
| 5,069,727 | A | * | 12/1991 | Kouzuma et al. | 136/251 |
| 5,259,883 | A | * | 11/1993 | Yamabe et al. | 118/725 |
| 5,436,204 | A | * | 7/1995 | Albin et al. | 438/488 |
| 5,779,877 | A | * | 7/1998 | Drinkard et al. | 205/560 |
| 5,858,819 | A | * | 1/1999 | Miyasaka | 438/149 |
| 6,160,215 | A | * | 12/2000 | Curtin | 136/244 |
| RE37,512 | E | * | 1/2002 | Szlufcik et al. | 438/57 |
| 8,168,463 | B2 | * | 5/2012 | Wieting | 438/61 |
| 8,183,066 | B2 | * | 5/2012 | Lee et al. | 438/22 |
| 8,217,261 | B2 | * | 7/2012 | Wieting | 136/265 |
| 2003/0230338 | A1 | * | 12/2003 | Menezes | 136/265 |
| 2006/0173113 | A1 | * | 8/2006 | Yabuta et al. | 524/439 |
| 2009/0058295 | A1 | * | 3/2009 | Auday et al. | 313/581 |
| 2010/0258179 | A1 | * | 10/2010 | Wieting | 136/256 |
| 2011/0018103 | A1 | * | 1/2011 | Wieting | 257/613 |
| 2011/0020980 | A1 | * | 1/2011 | Wieting | 438/98 |
| 2011/0071659 | A1 | * | 3/2011 | Farris et al. | 700/97 |
| 2011/0203634 | A1 | * | 8/2011 | Wieting | 136/244 |
| 2011/0259395 | A1 | * | 10/2011 | Wieting et al. | 136/246 |
| 2011/0259413 | A1 | * | 10/2011 | Wieting et al. | 136/256 |

(Continued)

*Primary Examiner* — Evan Pert
(74) *Attorney, Agent, or Firm* — Kilpatrick Townsend & Stockton LLP

(57) ABSTRACT

A system for recycling a work gas used in a thermal reactor for treating sample materials includes a thermal reactor using a work gas from a first source mixed with carrier gases. The work gas has a boiling point higher than the carrier gases. The system includes a pump, a condenser which converts the work gas into a liquid, and a scrubber.

12 Claims, 2 Drawing Sheets

(56) References Cited

U.S. PATENT DOCUMENTS

2011/0269260 A1* 11/2011 Buquing .................. 438/85
2011/0277836 A1* 11/2011 Lee ...................... 136/256
2012/0003789 A1* 1/2012 Doering et al. ............ 438/98
2012/0018828 A1* 1/2012 Shao ..................... 257/431
2012/0021552 A1* 1/2012 Alexander et al. ........... 438/57
2012/0094432 A1* 4/2012 Wieting .................. 438/102
2012/0122304 A1* 5/2012 Wieting .................. 438/507
2012/0186975 A1* 7/2012 Lee et al. .............. 204/192.25

* cited by examiner

METHOD AND SYSTEM FOR RECYCLING PROCESSING GAS FOR SELENIZATION OF THIN FILM PHOTOVOLTAIC MATERIALS

CROSS-REFERENCE TO RELATED APPLICATION

This application is a continuation of U.S. patent application Ser. No. 13/343,473, filed Jan. 4, 2012, which claims priority to U.S. Provisional Patent Application No. 61/432,869, filed Jan. 14, 2011, commonly assigned, and hereby incorporated by reference in its entirety herein for all purpose.

BACKGROUND OF THE INVENTION

The present invention relates generally to thin film techniques. More particularly, the present invention provides a system and a method for processing thin-film photovoltaic devices based on copper indium diselenide species (CIS), copper indium gallium diselenide species (CIGS), and/or others. The invention can be applied to thin film photovoltaic devices in panel modules, flexible sheets, building or window glass, automotive, and others.

In the process of manufacturing CIS and/or CIGS types of thin films, there are various manufacturing challenges, such as performing large scale thermal reactive treatment in a gaseous environment, maintaining structure integrity of substrate materials with extra large form factors, ensuring uniformity and granularity of the thin film material, etc. While conventional techniques in the past have addressed some of these issues, they are often inadequate in various situations. For example, a process of forming the gaseous environment for the reactive treatment includes supplying a work gas comprising gaseous selenide species into a furnace. The selenide species as a work gas not only is a relative expensive ingredient for the thin-film material but also is a potential hazard of environment. Therefore, it is desirable to have improved system and method for properly handling the work gas for large scale manufacture of thin film photovoltaic devices with substantial cost saving and environmental benefit.

BRIEF SUMMARY OF THE INVENTION

The present invention relates generally to thin-film photovoltaic techniques. More particularly, the present invention provides a system and method for handling work gas used for the manufacture of thin-film photovoltaic devices based on copper indium diselenide species (CIS), copper indium gallium diselenide species (CIGS), and/or others.

According to an embodiment, the present invention provides a method for recycling a work gas used for a thermal reactive process. The method includes coupling a pump to a furnace through a first valve. The furnace is configured to perform a thermal reactive process. The method further includes connecting a condenser to the pump through a second valve and coupling a scrubber to the pump through a third valve and alternatively to the condenser through a fourth valve. Additionally, the method includes pumping down the furnace before the thermal reactive process with the second valve closed and the third valve opened. Furthermore, the method includes supplying a process gas including a work gas mixed with one or more carrier gases for the thermal reactive process in the furnace with the first valve closed. The work gas is characterized by a first boiling point higher than a highest boiling point of any of the one or more carrier gases. The method further includes pumping down the furnace after the thermal reactive process to at least partially remove remaining process gas with the second valve and fourth valve opened and the third valve closed. Moreover, the method includes operating the condenser to liquefy the work gas at a temperature below the first boiling point and above the highest boiling point of any of the one or more carrier gases and transferring the liquefied work gas to a boiler for converting the liquefied work gas to a vapor. The vapor becomes part of the work gas for forming the process gas.

In an alternative embodiment, the present invention provides a system for recycling a work gas used in a thermal reactor for treating sample materials. The system includes a thermal reactor configured to perform a treatment of sample materials using a work gas from a first source mixed with one or more carrier gases. The work gas is characterized by a first boiling point higher than a highest boiling point of any of the one or more carrier gases. The system further includes a pump module coupled to the thermal reactor for creating an exhaust flow out of the thermal reactor after the treatment of sample materials. The exhaust flow includes at least partially the work gas. Additionally, the system includes a condenser module coupled to the pump module for receiving the exhaust flow. The condenser module is configured to convert the work gas into a liquid at a temperature below the first boiling point and above the highest boiling point of any of the one or more carrier gases. Furthermore, the system includes a scrubber module coupled to the pump module and respectively coupled to the condenser module. Moreover, the system includes a boiler module coupled to the condenser module to receive the liquid. The boiler module is configured to convert the liquid to a vapor and to guide the vapor for merging with the work gas from the first source.

It is to be appreciated that the present invention provides numerous benefits over conventional techniques. Among other things, the system and process of the present invention are compatible with conventional systems, which allow cost effective implementation. In various embodiments, the system and method for recycling the selenide gas substantially cut down the waste of valuable work material which translates to cost saving and product enhancement. Proper handling of the work gas also helps to reduce environmental hazard and improve production efficiency. There are other benefits as well.

DETAILED DESCRIPTION OF THE INVENTION

The present invention relates generally to thin-film photovoltaic techniques. More particularly, the present invention provides a system and method for handling work gas used for the manufacture of thin-film photovoltaic devices based on copper indium diselenide species (CIS), copper indium gallium diselenide species (CIGS), and/or others. The invention can be applied to made CIGS photovoltaic modules on panels, flexible sheets, building or window glass, automotive, and others.

Figure 1:
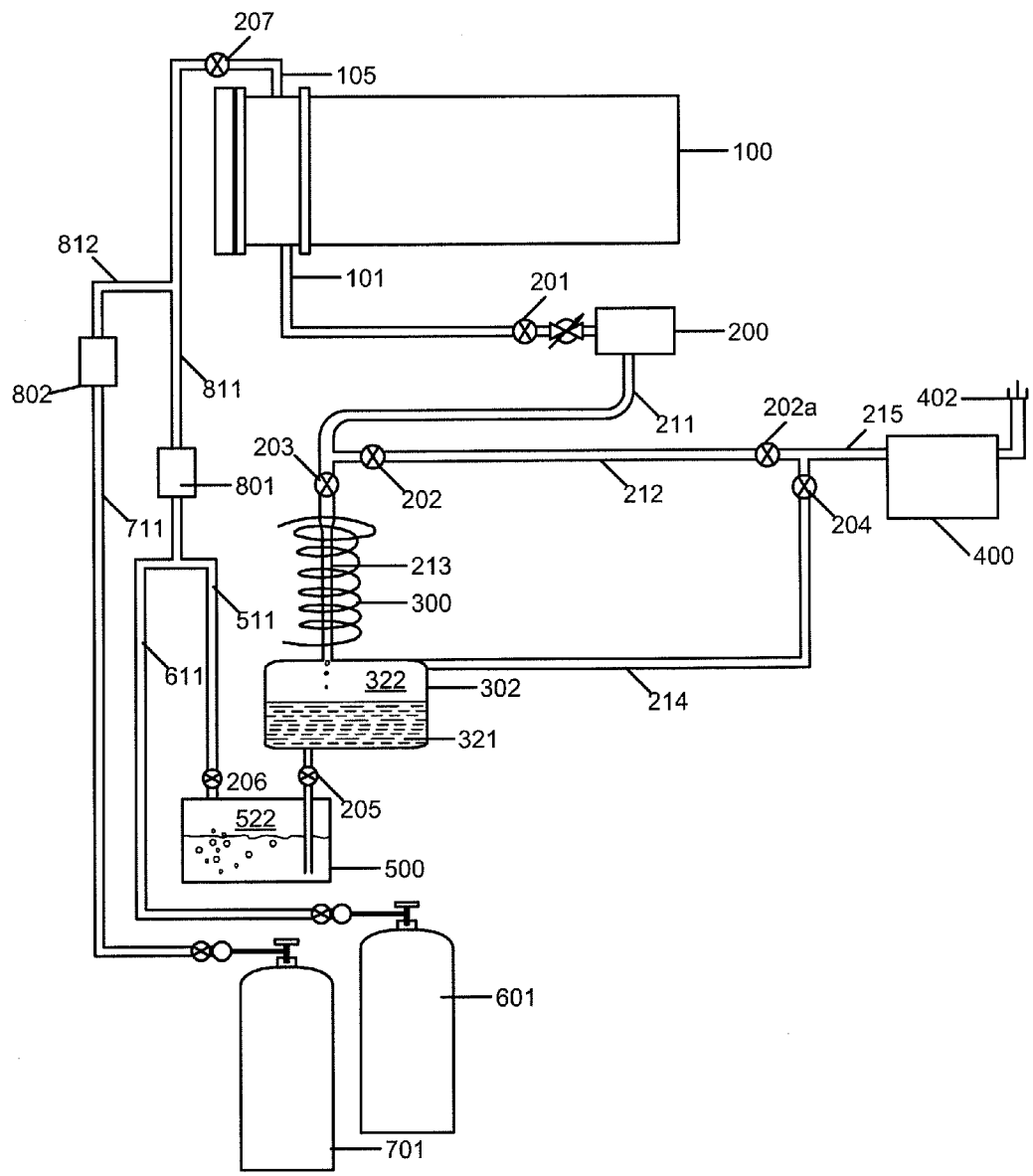
FIG. 1 is a diagram of a system for recycling a work gas for the manufacture of CIGS photovoltaic device.

FIG. 1 is a diagram of a system for recycling a work gas for the manufacture of CIGS photovoltaic device according to an embodiment of the present invention. As shown, the system 1000 is associated with a process furnace or thermal reactor 100 that is configured to perform thermal reactive treatment of thin-film devices under a gaseous environment within the furnace. In an example, the thermal reactor 100 is applied to treat thin-film photovoltaic devices using a process gas 101 comprising a mixture of a work gas and one or more carrier gases. In particular, embodiments of the present invention are applied to treat a thin-film device comprising a precursor material made by copper and indium (or gallium) species. The work gas includes at least a selenide gas (and also may include sulfide gas) although other types of work gas may be used depending on the applications. The carrier gas includes typically inert gas, for example, nitrogen gas, argon gas, or helium gas, depending on applications. In a specific embodiment, the system 1000 is configured to recycle the work gas each time after a treatment process following a predetermined thermal profile designed for the thermal reactor 100. Especially, the selenium element in the work gas used in the above example is a relative expensive material ingredient for forming a thin-film photovoltaic absorber.

In another specific embodiment, the system 1000 is configured to perform an integrated operation associated with the thermal reactive treatment process conducted with the thermal reactor 100. Typically at a specific time period after a designated processing stage is finished, the system 1000 starts to operate for recycling the work gas within the thermal reactor 100. As seen in FIG. 1, the system 1000 includes a pump module comprising a valve 201 and a pumping unit 200. The pump module connects to the thermal reactor via a pipe 111 to remove the remaining process gas 101 and generate an exhaust flow that is guided out by the pipe 211. In an example, the remaining process gas 101 after treating sample devices in the thermal reactor 100 contains an unconsumed portion of hydrogen selenide gas, the inert nitrogen gas (used as a carrier gas), and pyrolyzed hydrogen gas (resulted from thermal break-up of hydrogen selenide gas), while a small quantity of elemental Se particles form and is absorbed at a cooled chamber door region of the thermal reactor 100. The system 1000 is operated for recycling the unconsumed hydrogen selenide gas in the specific time period. In another example, after the thermal reactor is pump down it can be back-filled with another type of process gas comprising hydrogen sulfide gas, instead of hydrogen selenide gas, for additional thermal treatment of the same sample devices. Therefore, in another specific time period after the additional thermal treatment, the system 1000 can be used to recycle hydrogen sulfide gas from the exhaust flow generated by the pump module via pipe 111 and valve 201. In certain other time periods of operation of the thermal reactor 100, such as an initial pump down and final purge of the furnace, the exhaust flow may contain significant less portion of the work gas (e.g., hydrogen selenide gas, or hydrogen sulfide gas), instead, mainly the air, the one or more carrier gases, and other residue particles. In a preferred embodiment, the work gas to be recycled (specifically the hydrogen gas) can be characterized by a first boiling temperature that is at least higher than a highest boiling point of any other gases including the one or more carrier gas or other impurity gases.

Referring to FIG. 1, the system 1000 includes two pathways for the exhaust flow guided in pipe 211 via a valve 202 and valve 203, respectively. The first pathway guides the exhaust flow directly to a scrubber module 400. In a specific embodiment, the first pathway includes a pipe 212 connected to the valve 202, another valve 202a disposed between the pipe 212 and another pipe 215 which connects to the scrubber module 400. In an example, the first pathway is used to guide the exhaust flow during the time periods of initial pump down or final purge of the thermal reactor 100, because there is not much work gas in the furnace for recycling. The second pathway guides the exhaust flow directly to a condenser module 300. In a specific embodiment, the second pathway includes a pipe 213 connected the valve 203 to a container 302. The pipe 213 is configured to be surrounded by a condenser coil 300 running with a refrigerant fluid so that any gas molecules passed through the pipe 213 are subjected to a designated cooling process. In another specific embodiment, the condenser module 300 is configured to be set at an operation temperature that is below the first boiling temperature of the work gas but is higher than the highest boiling point of any other gaseous ingredients within the exhaust flow. As the result of the condenser module operation, the work gas is liquefied by the condenser coil 300 and collected as a liquid 321 by the container 302. The other gaseous ingredients remain in a gas state and are stored at a top portion of the container 302 as an exit gas 322. Of course, the exit gas may still contain a small quantity of the vapor of the liquid 321. A pipe 214 is connected to the top portion of the container 302 for guiding the exit gas 322 out. In an embodiment, the pipe 214 is connected to a valve 204 before merging with the pipe 215 that couples directly to the scrubber module 400 for further cleaning the exit gas.

In a specific embodiment, the hydrogen selenide gas is used as the work gas for reactively treating a copper-indium (and/or gallium) thin-film precursor material pre-formed on a substrate. The work gas is properly mixed with one or more carrier gases to form a process gas 101 before filling into the thermal reactor 100. In a specific embodiment, the process gas 101 comprises hydrogen selenide gas mixed with pure nitrogen gas in a ratio ranging from 1:4 to 1:12, and preferred to be about 1:10, with a total pressure set at about 650 Torr. Under the thermal power provided inside the thermal reactor and following a predetermined thermal profile for one or more process stages, a chemical reaction occurs and leads to a break-up of hydrogen selenide molecules so that selenium (Se) species is incorporated into the thin-film precursor material and the hydrogen species forms hydrogen ($H_2$) gas and releases into the gas mixture within the furnace. The reaction of Se with copper-indium precursor material results to a formation of copper-indium-diselenide (CIS) material. In an example, the precursor material also comprises gallium species and the reaction leads to the formation of copper-indium-gallium-diselenide (CIGS) material. Either the CIS material and CIGS material has a p-type semiconductor characteristic and forms a photovoltaic absorber of solar cell. More detail descriptions about the thermal selenization process for forming CIS/CIGS thin-film photovoltaic absorber in a large batch processing furnace can be found in U.S. patent application Ser. No. 12/568,644, entitled "Large Scale Method and Furnace System for Selenization of Thin Film Photovoltaic Materials," filed Sep. 28, 2009 and commonly assigned and incorporated as references for all purposes.

As the reactive thermal treatment proceeds till an end of a predetermined process stage, some selenium species are consumed and the process gas 101 now comprises remaining portion of hydrogen selenide ($H_2Se$) gas, a small quantity of hydrogen $H_2$ gas released from the break-up of $H_2Se$, nitrogen ($N_2$) gas as the carrier gas, and possibly some other impurity gases. When the system 1000 starts to remove the process gas 101 after the process stage, these gases will just the ingredients of the exhaust flow out of the pipe 212 generated by the pump module 200. A small quantity of selenium elemental particles also exits but they are heavier and likely have been absorbed by the relative cold regions like the cooled furnace door. In this example, selenium species is the resource to be recycled or recovered in terms of $H_2Se$ gas by the system 1000.

H₂Se gas has a relative higher boiling temperature at −41.25° C., compared to the boiling point of other gases in the exhaust flow: H₂ boiling point at −252.87° C., N₂ boiling point at −195.79° C., or Argon boiling point −185.85° C. This is an advantage taken by the condenser module 300 for separating the hydrogen selenide H₂Se from other gases in the exhaust flow. By operating the condenser module 300 at a temperature below the boiling point of H₂Se but above the highest boiling point of other gases (predominantly the nitrogen gas and small quantity of hydrogen gas), the H₂Se gas can be liquefied while other gases remain as a gas state. As shown in FIG. 1, liquid (H₂Se) 321 is retained in a lower part container 302 while other gases 322 occupies upper portion of the container 302. In this operation or during this time period of recycling process, the valve 202 is automatically closed and valve 203 opened. Also, the valve 204 is opened and the valve 202a is also closed to guide the other gases via the pipe 215 to the scrubber module 400. In an embodiment, the operation of the system 1000 is synchronized with the timing of performing thermal reactive treatment based on a predetermined temperature profile from ramping up furnace temperature to one or more dwelling stages and cooling down. More detail description about the selenization and sulfurization process following the temperature profile can be found in U.S. patent application Ser. No. 12/568,644, entitled "Large Scale Method and Furnace System for Selenization of Thin Film Photovoltaic Materials," filed Sep. 28, 2009 and commonly assigned and incorporated as references for all purposes.

In an embodiment, the reactive thermal treatment process includes applying hydrogen sulfide H₂S gas, replacing H₂Se gas, in one or more process stages. Because H₂S also has a relative high boiling point at −60.28° C., the system 1000 can be implemented for recycling H₂S in a same manner. One option is, if the process involving H₂S work gas is performed in the same thermal reactor following the process involving H₂Se work gas, to use the same system 1000 while having it controlled in timing schedule of condenser operation so that two liquefied materials can be properly stored. Another option is, of course, to install a redundant system (1000a) and operate the two systems separately and independently. Of course, H₂S may not be as valuable as H₂Se in terms of material cost.

As shown in FIG. 1, the scrubber module 400 is configured to clean any exhaust flow resulted from the thermal reactor 100 via a first pathway 212 and from the condenser module 300 via a second pathway 214. Since the work gas, for example hydrogen selenide gas, may be highly toxic to the environment. The exhaust flow from the thermal reactor 100 that possibly contains any quantity of such toxic ingredients must be treated or purified first before releasing to ambient through an exhaust port 402. In an example, a wet scrubber module is used for cleaning the exhaust flow. Wet scrubbing works via the contact of molecules of exhaust flow or particulate the work gas molecules with a scrubbing solution. The solution may simply be water or solutions of reagents that specifically target certain compounds. For example, a solution containing OH⁻ ionic group can help to clean the hydrogen selenide via an oxidization process. The scrubber module 400 also is configured to receive gases 322 flowing from the container 302 of the condenser module 300. The gases may contain a small quantity of hydrogen selenide vapor although most of it has been retained inside the container in liquid form. During the cycling time period, the valve 203 is opened and valve 204 is also opened while the valve 202a is closed to guide the gases to the scrubber module 400 after passing through the condenser module 300.

Referring again to FIG. 1, the system 1000 further includes a boiler module 500 coupled to the condenser module via a valve 205. After the work gas is transformed into the liquid 321, it can be led to the boiler module 500 to convert back to a vapor form. The valve 205 controls the liquid flow into the boiler module 500 where the liquid is heated above its boiling point to become a vapor 522. In an example, the boiler module 500 transforms the hydrogen selenide liquid to a hydrogen selenide vapor or gas. In another embodiment, the system 1000 further includes a pipe 511 coupled to the boiler module 500 via a valve 206 for deliver the vapor or gas 522. In an example, the vapor 522 is a recycled work gas that can be supplied back to the thermal reactor 100 for additional runs of thermal reactive treatment process. In a specific embodiment, the recycled vapor 522 guided by the pipe 511 is merged with the work gas from nominal supply line 611 which connects to a cylinder 601 of an original work gas supply source designated for the thermal reactor 100. Furthermore, the system 1000 can have at least a mass flow controller 801 configured to receive the merged work gas and set a flow rate for delivering the work gas to a gas line 811. The delivered work gas will first mix with a carrier gas in a gas line 812 independently supplied via a gas line 711 from a carrier gas source 701. Optionally, the carrier gas is controlled in terms a pressure indicator by another mass flow controller 802 or simply a pressure valve. In a specific embodiment, the work gas supplied in gas line 811 is controlled to be at 4-12% in total pressure which is set to about 650 torr for the mixture of the work gas and the carrier gas. In a preferred embodiment, the work gas versus the carrier gas is set to be about 1:10 ratio to form the process gas to be used to fill the furnace or thermal reactor with the set pressure of about 650 torr. In a specific embodiment, a pressure release valve 207 is used to keep the pressure within the furnace 100 at approximately 650 torr. Of course, there can be many variations, alternatives, and modifications in the selection of mixing ratio between the work gas and the carrier gas and the work pressure for performing the reactive thermal process in the furnace.

Figure 2:
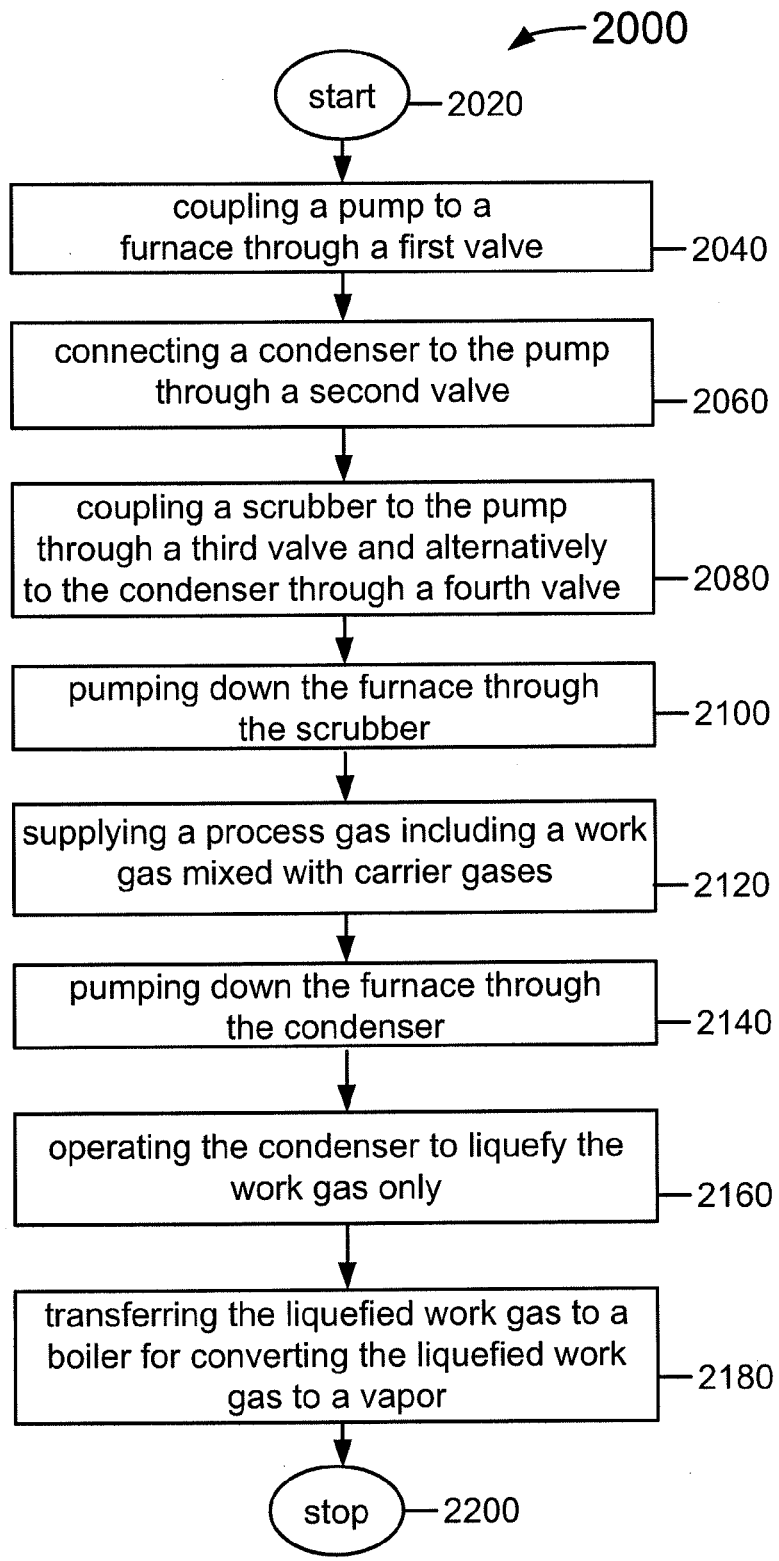
FIG. 2 is a diagram illustrating a method for recycling a work gas for treating thin-film CGIS photovoltaic device.

FIG. 2 is a diagram illustrating a method for recycling a work gas for treating thin-film CGIS photovoltaic device according to an embodiment of the present invention. As shown in FIG. 2, the method includes:
1. Start;
2. Couple a pump to a furnace through a first valve;
3. Connect a condenser to the pump through a second valve;
4. Couple a scrubber to the pump through a third valve and alternatively to the condenser through a fourth valve;
5. Pump down the furnace through the scrubber;
6. Supply a process gas including a work gas mixed with carrier gases in the furnace for treating a sample material;
7. Pump down the furnace through the condenser;
8. Operate the condenser to liquefy substantially only the work gas;
9. Transfer the liquefied work gas to a boiler for converting the liquefied work gas to a vapor; and
10. Stop.

The method 2000 begins at start, step 2020. Here, the user of the method begins at a furnace or a thermal reactor, such as the one noted above. The thermal reactor can be maintained at about room temperature and atmosphere before proceeding with the present method.

A plurality of substrates is transferred into the thermal reactor, step 2020, to be treated by a work gas in a thermal reactive process. Each of the plurality of substrates can include a precursor material to be reacted with at least one target element provided by the work gas. For example, the precursor material is a thin-film comprising several material species separately or commonly deposited over the substrates before loaded into the thermal reactor. In an example, the plurality of substrates can be 40 or more individual substrates, each having a dimension of 65 cm to 165 cm or smaller. But it is understood that other dimensions are possible. In another example, each of the substrates is a planar shaped glass plate maintained substantially free from warp or damage. The precursor material is a mixture or alloy with a predetermined stoichiometry of copper species, indium species, and/or gallium species, and doped with sodium species. The thermal reactive process using the work gas is intended to conduct at an elevated temperature above 425° C. to nearly 525° C. for transforming the precursor material into a thin-film photovoltaic absorber material. In one embodiment, the thermal reactive process is a selenization process as the work gas contains selenium species for reacting with the copper-based precursor material. The selenium species may come from gaseous elemental selenium vapor or extracted a selenide gas such as hydrogen selenide gas. The absorber to be formed will be a thin-film selenide material. In another embodiment, another thermal reactive process followed the selenization process is a sulfurization process as the work gas is replaced by hydrogen sulfide gas, after a purge of hydrogen selenide gas, for further incorporating sulfur species into the thin-film selenide material.

A pump or pump system is coupled to the thermal reactor or furnace via a first valve in step 2040. The pump is operated to create or maintain a vacuum state for the furnace at several process stages. For example, the pump at least is configured to conduct operation during several process stages: 1) an initial pumping down, 2) a purge of used process gas after finishing one process run (with one type of work gas), and 3) a final purge of process gas after all processes. In stage 1) and 3), the pump system is able to create an exhaust flow out of the furnace which contains substantially insignificant quantity of the work gas. While in stage 2), the pump system is create another exhaust flow that contains substantially significant quantity of the work gas among other carrier gas or impurities.

A condenser is connected to the pump system through a second valve in step 2060. In an embodiment, the condenser is configured to recycle one or more target species from an exhaust flow generated by the pump system. In an example, the pump system is operating at a stage 2) above for purging the used process gas after finishing one process run. Within the used process gas there are substantial portion of un-consumed work gas as a recycling target species. In an embodiment, the condenser is utilizing a relative high boiling point of the target gas species compared to the rest gas species among the used process gas to separate the target species by converting it to a liquid while keeping the rest gas species in a gas state, thereby recollecting the target gas species. In a specific embodiment, the condenser includes a condenser coil with running refrigerant fluid to surround a tube or pipe with the exhaust flow passing by and also includes a container for retaining the liquefied target work gas while delivering the remaining species in gas state as an exit gas flow. The exit flow includes mainly the rest gas species with a substantially small quantity of the target gas species.

A scrubber module is connected to the pump system via at least a third valve and alternatively connected to the condenser via a fourth valve in step 2080. In an embodiment, the scrubber module includes a first operation mode configured to receive the exhaust flow directly from the pump system and to treat the exhaust flow before releasing to ambient. In particular, the scrubber module is to clean toxic species in the exhaust flow which mainly comes from the work gas or residue gas released during the chemical reaction between the work gas and sample materials inside the thermal reactor. At the first operation mode, the second valve and the fourth valve are closed and the third valve is opened. Depending on the use of work gas type and designated chemical reactions in one or more process stages with elevated temperatures, the scrubber module can be a wet scrubber module or a dry scrubber module for cleaning the toxic elements with efficiency and completeness. In another embodiment, the scrubber module includes a second operation mode configured to receive the exit gas flow from the condenser and still to clean any toxic species therein. At the second operation mode, the second valve and the fourth valve are opened and the third valve is closed.

An initial pumping down operation of the furnace is carried out through the pump and the scrubber, in step 2100. As mentioned above, there is not much toxic gas for the furnace in an ambient condition, however, absorbed toxic elements can still be released into the exhaust flow during this operation. The third valve will be opened to allow the exhaust flow directly into the scrubber from the pump system. This step 2100 creates a vacuum environment inside the furnace ready for filling a process gas.

A process gas including a work gas mixed with carrier gases is supplied into the furnace for treating a sample material, in step 2120. In an embodiment, the process gas is premixed with a work gas and one or more carrier gases with a predetermined ratio range. In an example, the mixture is monitored by the gas pressure. Specifically, the work gas is hydrogen selenide gas filled in with a partial pressure of about 65 torr. In an embodiment, the work gas is delivered controllably by a mass flow controller in terms of a set flow rate. The work gas is mixed with a pure nitrogen gas so that the total pressure inside the furnace is about 650 torr. In other embodiments, the work gas and the carrier gas has a mixing ratio ranging from 1:4 to 1:12, while preferred ratio at 1:10. With the thermal reactive process is carried on, the furnace temperature changes and so does the pressure. The mass flow controller or a pressure valve is used to adjust the flow of the work gas supply. Of course, there can be many variations, alternatives, and modifications. For example, the hydrogen selenide gas is supplied as a work gas for specifically treating a copper-based precursor sample material for forming a semiconductor photovoltaic absorber. Additionally, the furnace then will be heated following a predetermined temperature profile including one or more temperature ramping stages and one or more process dwelling stages. During the whole process stages, the process gas is evolving as work gas element is consumed to be incorporated into the precursor sample material, or residue gas is released into the furnace due to the thermal reaction, or new gas is formed from thermal pyrolzed molecules of the work gas. For example, after a process dwelling stage at an elevated temperature (e.g., about 425° C.), about 15% of hydrogen selenide gas is consumed, a small fraction of hydrogen selenide pyrolzes into elemental Se and release hydrogen gas ($H_2$) as a by-product into the furnace, while remaining 80+% of hydrogen selenide gas stays. In another process dwelling stage at another elevated temperature, a new process gas may include another work gas mixed with the carrier gas. Between the two dwelling stages, there can be a temperature ramping stage while the process gas for treating the sample at the earlier dwelling stage is purged out before the new process gas is filled in.

The furnace is pumped down by the pump system to send an exhaust flow through the condenser, in step 2140. In an embodiment, the furnace is operating in a time period that needs to purge out the used process gas therein and the condenser is in an operation mode for recycling the target gas species within the purged exhaust flow. In this operation mode, the second valve is opened to allow the exhaust flow to pass through the condenser coil where the operating temperature has been set at a value that is lower than the boiling point of a target gas species but higher than rest gas species. In an embodiment, the purged exhaust flow is a used process gas after a thermal reactive process including unconsumed work gas, carrier gas, and any released gas during the thermal reaction as a by-product. For example, the work gas is hydrogen selenide gas intended for reactively treating a copper-indium based thin-film precursor material at an elevated temperature for forming a thin-film photovoltaic absorber. After the thermal reactive treatment, about 15% of hydrogen selenide gas is consumed and a small quantity of hydrogen selenide is thermally pyrolzed into elemental Se with $H_2$ gas as a by-product released into the process gas mixture. The rest 80+% hydrogen selenide remains in the used process gas including also 90% nitrogen gas as carrier gas.

In step 2160, the method operates the condenser to liquefy substantially only the work gas out of the purged exhaust flow. In the example mentioned above, as all the gas species in the exhaust flow pass through the condenser coil operated at a temperature below the boiling point of the target species, i.e., hydrogen selenide, hydrogen selenide gas is then liquefied into a $H_2Se$ liquid while rest species including mainly $H_2$ gas and $N_2$ gas (either of which has a much lower boiling point than $H_2Se$) still is in a gas phase, physically being separated from the $H_2Se$ liquid. Of course, there can be many variations, alternatives, and modifications. For example, the thermal reactor may be in different operation stage where the process gas is replaced by a new work gas or there may be different type of gas by-product after a different thermal reactive process, but one or more embodiments described above can be still applied.

The liquefied work gas is transferred to a boiler to be converted back to a vapor, in step 2180. The boiler has an input port coupled to the container of the condenser via a valve. The liquid target species stored in the container can be controllably sent to the boiler where the liquid is heated to transform the recycled liquid back to its vapor form. The boiler also includes a output port for deliver the vapor species. In an example, the $H_2Se$ liquid flows from the condenser container to the boiler and is turned into $H_2Se$ vapor. Through the output port the $H_2Se$ vapor or gas is delivered out through a gas line. The gas line can be directly led back to the thermal reactor to complete the recycling process. In a specific embodiment, the gas line of the $H_2Se$ vapor is first merged with another gas line originated from the $H_2Se$ gas supply cylinder. Then a mass flow controller is added to deliver the merged $H_2Se$ gas with a steady flow rate. The $H_2Se$ gas flow is determined based on the total pressure required for the thermal reactive treatment in the furnace. In another specific embodiment, the work gas is provided as a just about 10% part of a process gas and the rest 90% part provided by an inert carrier gas. For example, the hydrogen selenide gas is mixed with nitrogen gas and the combined process gas is filled the furnace with a pressure set at approximately 650 torr. In an alternative embodiment, the thermal reactive process may be extended to another process stage where the work gas can be replaced by a new work gas, the recycling operation can be carried by using a switch valve to link to a redundant condenser and boiler combination to the pump output port. Therefore, the new work gas can be recycled although the condenser or boiler may be adjusted their operation conditions accordingly.

In step 2200, the method includes a stop operation. When the thermal reactive process including one or more process dwelling stages during which the sample material has been treated using one or more work gases, a cooling stage may start and the furnace final purge also starts. The recycling operation can be stopped and the valve towards the scrubber module is opened to send the final purged exhaust flow directly for pollution control and release to ambient.

It is also understood that the examples and embodiments described herein are for illustrative purposes only and that various modifications or changes in light thereof will be suggest to persons skilled in the art and are to be included within the spirit and purview of this application and scope of the appended claims. For example, other processes may include process involving the change of temperatures, introduction and removal of certain gaseous species, change in flow rates of certain gaseous species, change in pressure of the furnace, or the manipulation of various valves for matching process flow, adjustment of condenser/boiler combination operation and any other parameters. These steps are merely examples and should not limit the scope of the claims herein. One of ordinary skill in the art would recognize many other variations, modifications, and alternatives. For example, various steps outlined above may be added, removed, modified, rearranged, repeated, and/or overlapped, as contemplated within the scope of the invention.

What is claimed is:

1. A method for recycling a work gas used for a thermal reactive process, the method comprising:
   supplying a process gas including a work gas mixed with one or more carrier gases for a thermal reactive process in a furnace, the work gas being characterized by a first boiling point higher than a highest boiling point of any of the one or more carrier gases;
   pumping down the furnace after the thermal reactive process to at least partially remove remaining process gas;
   operating the condenser to liquefy the work gas at a temperature below the first boiling point and above the highest boiling point of any of the one or more carrier gases; and
   transferring the liquefied work gas to a boiler for converting the liquefied work gas to a vapor, the vapor being part of the work gas for forming the process gas.

2. The method of claim 1 wherein the pumping down the furnace before the thermal reactive process comprises creating a vacuum environment by sending an exhaust flow directly to a scrubber for removing toxic species before releasing a cleaned gas to ambient.

3. The method of claim 1 wherein the supplying the process gas comprises setting a flow rate controlled by a mass flow controller for the work gas to mix with the one or more carrier gases.

4. The method of claim 3 wherein the work gas comprises hydrogen selenide gas, the one or more carrier gases comprises at least pure nitrogen gas, the hydrogen selenide gas being set to be about 10% of the nitrogen gas with a total pressure of about 650 torr in the furnace.

5. The method of claim 4 wherein the hydrogen selenide gas is partially consumed in a selenization reaction with a sample material during the thermal reactive process to form a selenide material and to release hydrogen gas.

6. The method of claim 5 wherein the pumping down the furnace after the thermal reactive process comprises sending the remaining process gas and the released hydrogen gas during the thermal reactive process as an exhaust flow into the condenser.

7. The method of claim 1 wherein the operating the condenser to liquefy the work gas comprises extracting out the one or more carrier gases out of the remaining process gas to the scrubber while retaining the liquefied work gas in a container.

8. A system for recycling a work gas used in a thermal reactor for treating sample materials, the system comprising:
- a thermal reactor;
- a pump module coupled with the thermal reactor configured to create an exhaust flow out of the thermal reactor;
- a condenser module coupled with the pump module configured to receive the exhaust flow;
- a scrubber module coupled with the pump module and respectively coupled to the condenser module.

9. The system of claim 8 wherein the scrubber module is configured to process any exhaust flow directly from the pump module during an initial pumping down or a final purge of the thermal reactor.

10. The system of claim 8 wherein the scrubber module is further configured to process a gas flow substantially without the work gas from the condenser module.

11. The system of claim 8 further comprising a mass flow controller configured to receive the merged work gas and deliver the work gas with a predetermined flow rate to mix with the one or more carrier gas.

12. The system of claim 8 further comprising a boiler module coupled with the condenser module.

* * * * *